US00RE47901E

(19) United States
(12) Reissued Patent
Schiller et al.

(10) Patent Number: US RE47,901 E
(45) Date of Reissued Patent: Mar. 17, 2020

(54) TAG-LOOP CARRIER ASSEMBLY

(71) Applicant: Bedford Industries, Inc., Worthington, MN (US)

(72) Inventors: David Schiller, Sioux Falls, SD (US); Curtis John Heinrichs, Sibley, IA (US)

(73) Assignee: Bedford Industries, Inc., Worthington, MN (US)

(21) Appl. No.: 29/680,986

(22) Filed: Feb. 21, 2019

Related U.S. Patent Documents

Reissue of:
(64) Patent No.: Des. 816,341
Issued: May 1, 2018
Appl. No.: 29/569,353
Filed: Jun. 27, 2016

U.S. Applications:
(60) Division of application No. 29/542,306, filed on Oct. 13, 2015, now Pat. No. Des. 762,985, which is a continuation of application No. 29/496,818, filed on Jul. 17, 2014, now abandoned, which is a division of application No. 29/437,913, filed on Nov. 21, 2012, now Pat. No. Des. 712,154.

(51) LOC (12) Cl. ..... 03-01
(52) U.S. Cl.
USPC ..... D3/328; D3/318
(58) Field of Classification Search
USPC ..... D3/318, 328
CPC ..... G09F 3/18; B65D 69/00
See application file for complete search history.

(56) References Cited

U.S. PATENT DOCUMENTS

D532,049 S * 11/2006 Ludlow ..... D20/22
7,836,622 B1 * 11/2010 King ..... G09F 3/14 206/820
D712,154 S * 9/2014 Schiller ..... D3/328
D723,621 S * 3/2015 Heinrichs ..... D20/22
D762,985 S * 8/2016 Schiller ..... D3/328
2005/0166439 A1 * 8/2005 Ludlow ..... G09F 3/14 40/665
2009/0188144 A1 * 7/2009 Ludlow ..... G09F 3/04 40/665

* cited by examiner

*Primary Examiner* — Philip S Hyder
(74) *Attorney, Agent, or Firm* — James L. Young; Westman, Champlin & Koehler P.A.

(57) CLAIM

The ornamental design for a tag-loop carrier assembly, as shown and described.

DESCRIPTION

FIG. 1 is a front view of a tag-loop carrier assembly;
FIG. 2 is a back view thereof;
FIG. 3 is a top view thereof;
FIG. 4 is a bottom view thereof;
FIG. 5 is a side view thereof, as taken from the left side of FIG. 1;
FIG. 6 is a side view thereof; as taken from the right side of FIG. 1; and,
FIG. 7 is a sectional view as taken along lines 7-7 in FIG. 1.

The evenly spaced broken lines are for the purpose of illustrating environment and form no part of the claimed design. The dot-dash-dot broken away lines in the drawings indicate that any portion of the article beyond what is shown forms no part of the claimed design.

1 Claim, 2 Drawing Sheets

Figures 3, 4, 5, 6:
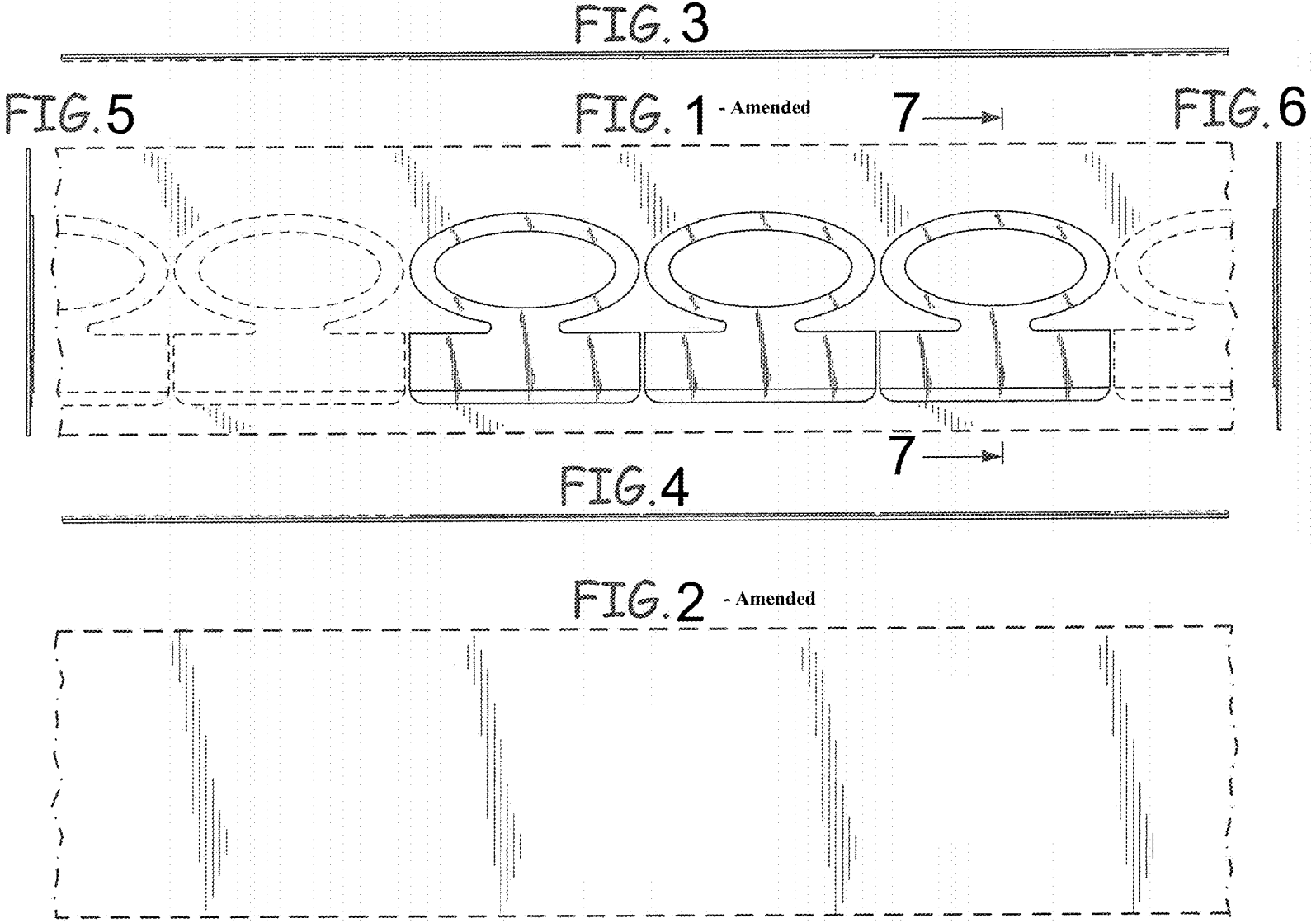
Figure 7:
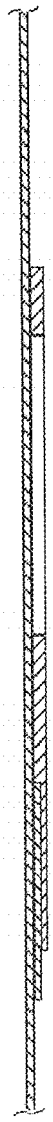

Matter enclosed in heavy brackets [ ] appears in the original patent but forms no part of this reissue; matter printed in italics indicates the additions made by reissue.

FIG. 1 - Amended 7
7

FIG. 2 - Amended